United States Patent
Okada et al.

(10) Patent No.: US 8,265,510 B2
(45) Date of Patent: Sep. 11, 2012

(54) MULTI-FUNCTION APPARATUS

(75) Inventors: Hidekazu Okada, Hashima (JP); Tatsuya Sato, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1231 days.

(21) Appl. No.: 11/965,082

(22) Filed: Dec. 27, 2007

(65) Prior Publication Data

US 2009/0060555 A1   Mar. 5, 2009

(30) Foreign Application Priority Data

Dec. 28, 2006   (JP) .................................. 2006-354745

(51) Int. Cl.
G06F 3/00 (2006.01)

(52) U.S. Cl. .......... 399/81; 715/700; 715/821; 345/156; 345/172

(58) Field of Classification Search .................... 399/81; 345/156, 172; 715/700, 821
See application file for complete search history.

(56) References Cited

U.S. PATENT DOCUMENTS

| 5,565,964 A | * | 10/1996 | Tashiro et al. .................. 399/83 |
| 5,950,045 A | | 9/1999 | Nomura et al. |
| 2001/0026290 A1 | | 10/2001 | Machida et al. |

FOREIGN PATENT DOCUMENTS

| JP | 11134156 A | 5/1999 |
| JP | 2001273068 A | 10/2001 |
| JP | 2004200957 A | 7/2004 |

* cited by examiner

*Primary Examiner* — David Porta
*Assistant Examiner* — Yara Green
(74) *Attorney, Agent, or Firm* — Baker Botts L.L.P.

(57) ABSTRACT

A multi-function apparatus having a plurality of functions relating to an image processing and configured to selectively realize one of the plurality of functions, including: a plurality of operation keys which are operated by a user so as to control the multi-function apparatus; a display device configured to display an operation view for assisting the user in operating the plurality of operation keys; and a display control section configured to control the display device to display the operation view in which a plurality of images respectively representing the plurality of operation keys are displayed, such that an image of each of at least one active key each as an active one of the plurality of operation keys is displayed in the view in a first manner, while an image of each of at least one inactive key each as an inactive one of the plurality of operation keys is displayed in the view in a second manner which is different from the first manner.

19 Claims, 10 Drawing Sheets

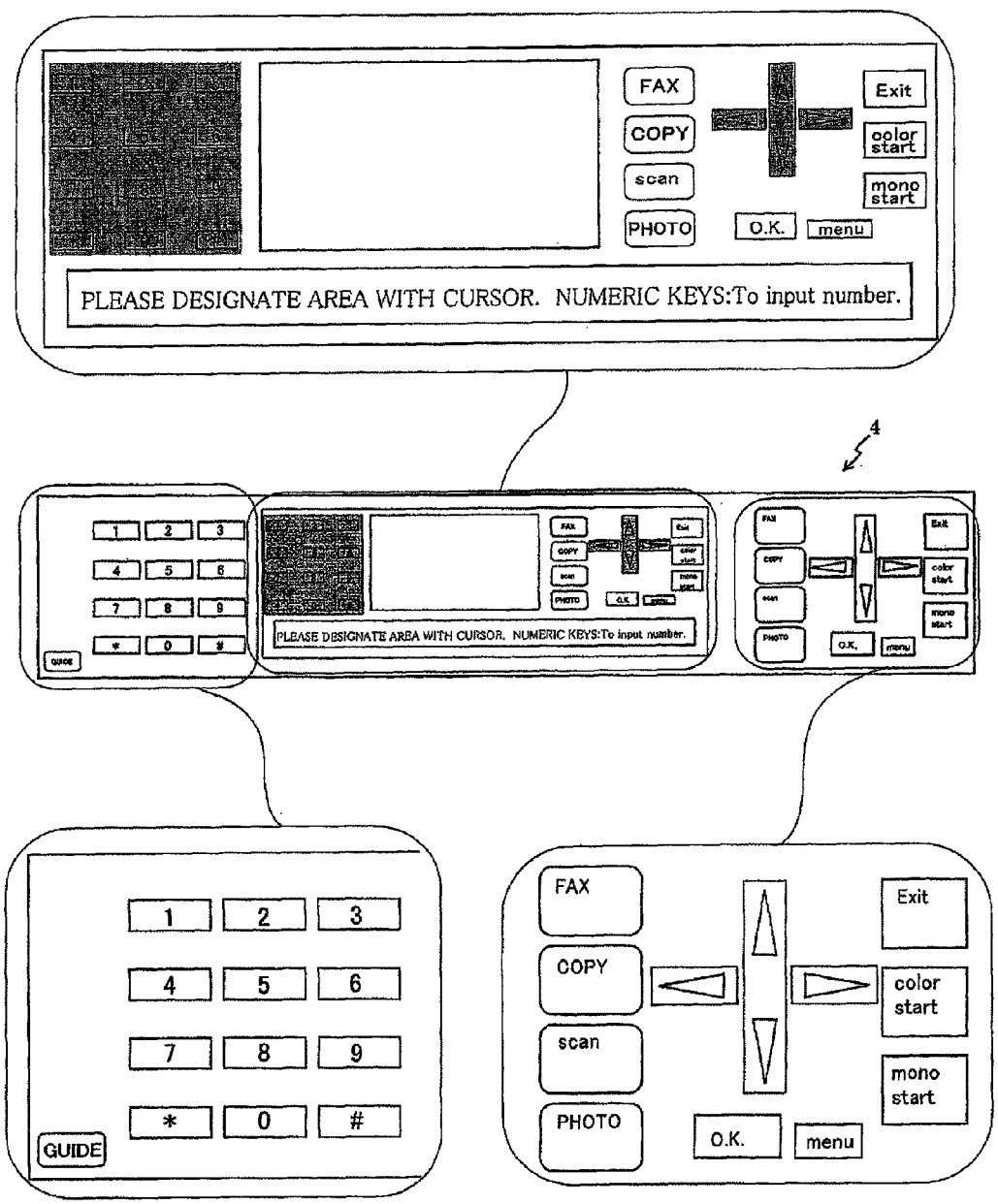

MULTI-FUNCTION APPARATUS

CROSS REFERENCE TO RELATED APPLICATION

The present application claims priority from Japanese Patent Application No. 2006-354745, which was filed on Dec. 28, 2006, the disclosure of which is herein incorporated by reference in its entirety.

BACKGROUND OF THE INVENTION

1. Field of the Invention

The present invention relates to a multi-function apparatus having a plurality of functions such as facsimile, copying, and scanner functions.

2. Description of the Related Art

There is conventionally known a multi-function apparatus having a plurality of functions, relating to an image processing, such as a facsimile transmitting/receiving function for transmitting/receiving image data via a communication line, a copying function for reading image recorded on a document and recording the image on a recording medium, and a scanner function for reading image recorded on a document and storing data of the recorded image in a storage means.

Patent Document 1 (Japanese Patent Application Publication No. 2001-273068) and Patent Document 2 (Japanese Patent Application Publication No. 11-134156) disclose apparatuses each including a liquid crystal display which is equipped with a touch panel and on which an image of an operation panel is displayed. According to the apparatus, a user can perform operations to each of the apparatuses by touching the touch panel.

Patent Document 3 (Japanese Patent Application Publication No. 2004-200957) discloses an apparatus including a display which is equipped with no touch panel and on which an arrangement of operation keys and instructions for operating the operation keys are displayed.

SUMMARY OF THE INVENTION

However, the apparatus disclosed in Patent Document 1 and Patent Document 2 suffers from a problem that the touch panel leads to higher cost. Further, in the apparatus disclosed in Patent Document 3, since the instructions for operating the operation keys are merely displayed, a user cannot instantly understand which one of the operation keys should be operated when selecting one of the operation keys. That is, the user cannot instantly understand which key is active and which key is inactive in a case where the operation keys are set to be divided into at least one active operation key, for executing a processing assigned thereto when pressed, and at least one inactive operation key, for not executing a processing assigned thereto when pressed. Thus, the user has a difficulty in operating the apparatus.

This invention has been developed to solve the above-described problems, and it is an object of the present invention to provide a multi-function apparatus which can be produced at a relatively low cost and which has improved operability.

The object indicated above may be achieved according to the present invention which provides a multi-function apparatus having a plurality of functions relating to an image processing and configured to selectively realize one of the plurality of functions, comprising: a plurality of operation keys which are operated by a user so as to control the multi-function apparatus; a display device configured to display an operation view for assisting the user in operating the plurality of operation keys; and a display control section configured to control the display device to display the operation view in which a plurality of images respectively representing the plurality of operation keys are displayed, such that an image of each of at least one active key each as an active one of the plurality of operation keys is displayed in the view in a first manner, while an image of each of at least one inactive key each as an inactive one of the plurality of operation keys is displayed in the view in a second manner which is different from the first manner.

In the multi-function apparatus constructed as described above, the user can easily find a desired key by referring and understanding the image of at least one active key and the image of at least one inactive key displayed in the respective first and second manners, thereby improving operability of the multi-function apparatus. Further, the multi-function apparatus does not include an expensive component or device such as a touch panel and an indicator (e.g., an LED) provided for each of operation keys, which leads to lower cost of the multi-function apparatus.

BRIEF DESCRIPTION OF THE DRAWINGS

The above and other objects, features, advantages, and technical and industrial significance of the present invention will be better understood by reading the following detailed description of preferred embodiments of the invention, when considered in connection with the accompanying drawings, in which:

FIG. 5C is a plan view showing the operation panel in a state in which a guide key has been pressed;

DESCRIPTION OF THE PREFERRED EMBODIMENTS

Figure 1:
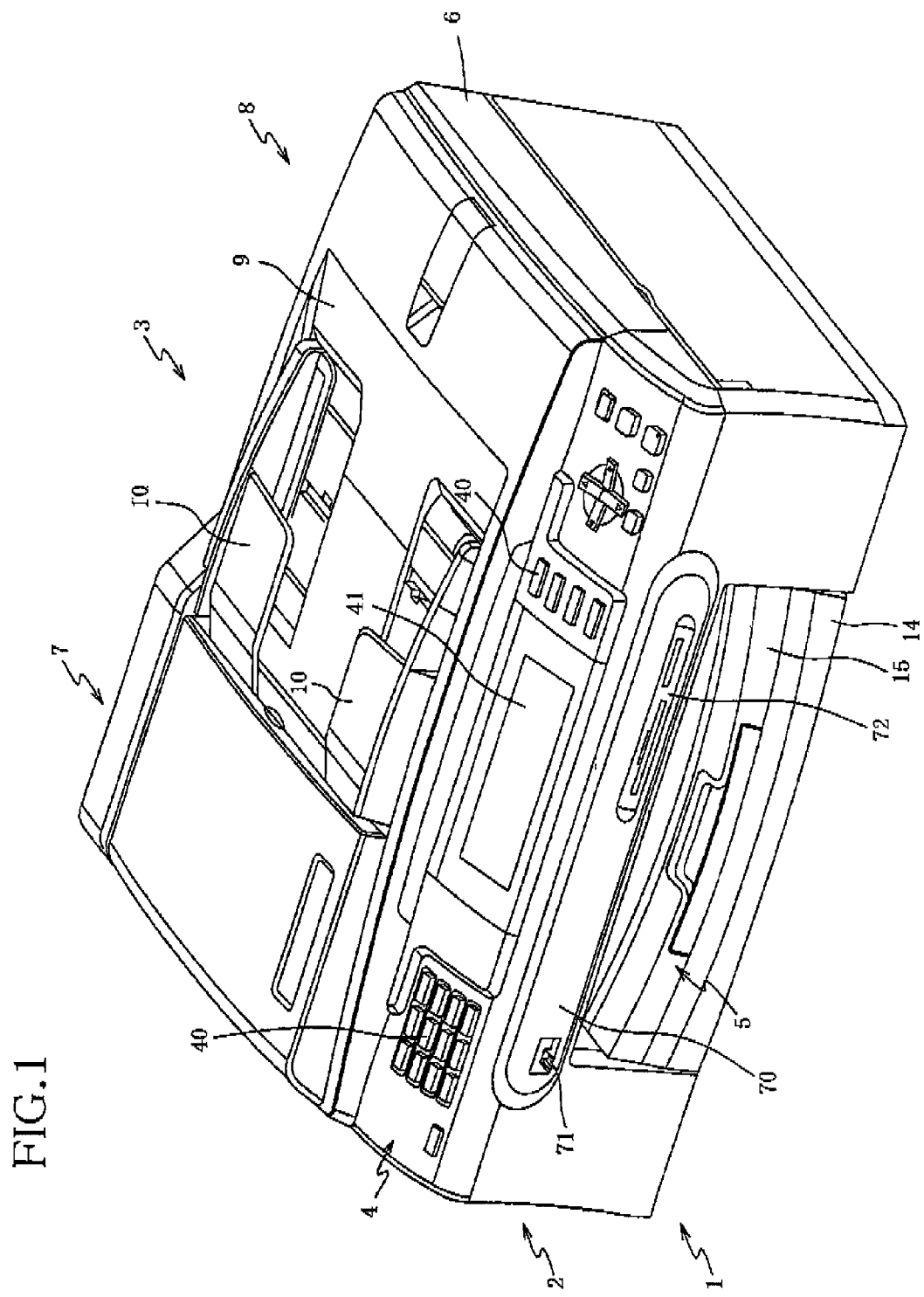
FIG. 1 is an external perspective view showing a multi-function apparatus as an embodiment of the present invention.

Hereinafter, there will be explained preferred embodiment of the present invention with reference to the accompanying drawings. FIG. 1 is an external perspective view showing a multi-function apparatus 1 as an embodiment of the present invention. It is noted that the multi-function apparatus 1 will be referred to as an MFP 1 because the multi-function apparatus 1 is also called a multi-function peripheral. As shown in FIG. 1, the MFP 1 includes a printer section 2 at its lower portion, a scanner section 3 at its upper portion, and an operation panel 4 in front of the scanner section 3, integrally with each other. The MFP 1 has a printing function, a scanner function, a copying function, and a facsimile function.

The MFP 1 can be connected to an external computer to record or print images or characters on a recording sheet (i.e., a recording medium) on the basis of image data or character data transmitted from the external computer. The MFP 1 can also be connected to an external device such as a digital camera to record images on a recording sheet on the basis of image data outputted from the external device. Further, in the MFP 1, one of various storage media (e.g., a memory card) can be mounted to record images or characters on a recording sheet on the basis of image data or the like stored in the one of various storage media.

The scanner section 3 includes: a document reading table 6 functioning as a flatbed scanner (FBS); and a document cover 8 equipped with an auto document feeder 7 (hereinafter, referred to as an ADF 7). The document cover 8 is attached to the document reading table 6 via hinges at a rear side of the MFP 1 so as to be opened and closed.

The document reading table 6 has, in an upper surface thereof, an relatively large opening into which a platen glass is fitted. Within the document reading table 6, there are a space for a movement of an image-reading unit (not shown) incorporated in the document reading table 6 and a space for disposition of the image-reading unit, supporting members for supporting the image-reading unit, drive mechanisms for driving the image-reading unit, and so on.

The ADF 7 feeds a document from a document-supply tray 9 to a document-discharge tray 10 through a document-feed path.

The printer section 2 is an ink-jet image recording device (i.e., an ink-jet recording device) configured to eject ink droplets onto a recording sheet to record an image thereon on the basis of image data read by the scanner section 3 or inputted from an external device. The printer section 2 is disposed below the scanner section 3, as described above.

An opening 5 is formed in a front portion of the MFP 1, namely, in a front portion of the printer section 2. In the opening 5, a sheet-supply tray 14 and a sheet-discharge tray 15 are provided so as to be accommodated completely in the MFP 1. The sheet-supply tray 14 and the sheet-discharge tray 15 are disposed so as to have a two-tier structure in which the sheet-discharge tray 15 is located above the sheet-supply tray 14.

The operation panel 4 having an oblongly rectangular shape as shown in FIG. 1 is provided on a front side of the MFP 1. The operation panel 4 is operated by a user so as to control the printer section 2 and the scanner section 3, and is provided with various operation keys 40 and a Liquid Crystal Display 41 (hereinafter referred to as a LCD 41) as a display device. The LCD 41 includes two screens arranged side by side. Each of two screens has a depth-to-width ratio of 3:4. Thus, the LCD 41 has a depth-to-width ratio of 3:8.

A user can input desired commands using the operation panel 4. When a predetermined command is inputted to the MFP 1, the MFP 1 is controlled on the basis of the inputted command. The operation panel 4 will be explained in detail with reference to FIG. 3.

A connecting panel 70 is provided above the opening 5 of the printer section 2. In the connecting panel 70, a USB terminal 71 is provided at a left end portion thereof. The USB terminal 71 functions as a connector terminal which is connected to the external device via USB connection so as to permit the MFP 1 to communicate with the external device. In the connecting panel 70, a slot portion 72 is provided at a right end portion thereof. The slot portion 72 includes a plurality of card slots into each of which a card memory as a memory in the form of a card can be mounted. When the card memory is mounted into one of the card slots, image data is read out from the card memory. Then, an image based on the read image data or information with respect to the image data is displayed on the LCD 41. Alternatively, an image selected by a user is recorded on a recording sheet by the printer section 2.

Figure 2:
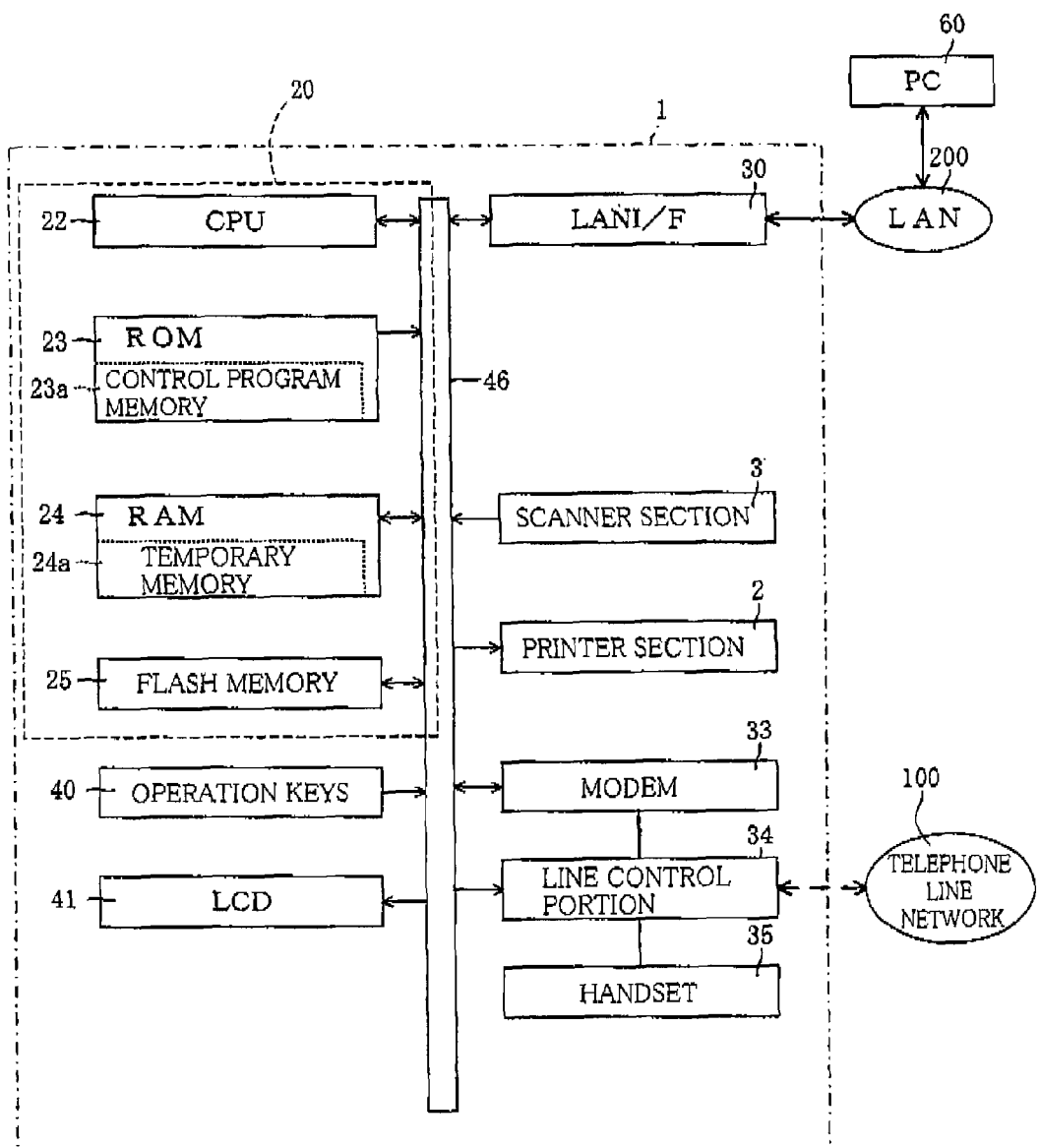
FIG. 2 is a block diagram showing an electric construction of the multi-function apparatus.

There will be next explained, with reference to FIG. 2, a schematically electric construction of MFP 1. FIG. 2 is a block diagram showing an electric construction of the MFP 1. As shown in FIG. 2, the MFP 1 includes a microcomputer 20 mainly including a Central Processing Unit (CPU) 22, a Read Only Memory (ROM) 23, a Random Access Memory (RAM) 24, and a flash memory 25. The microcomputer 20 is connected via a bus 46 to the operation keys 40, the LCD 41, a LAN interface (I/F) 30, the scanner section 3, the printer section 2, a modem 33, a line control portion 34, the slot portion 725 and so on. A handset 35 is connected to the line control portion 34, thereby permitting a user to make a telephone conversation.

In the ROM 23, there are stored: various control programs for controlling the facsimile function, the copying function, the scanner function, and so on; and constants, tables, and so on used for the control programs. The control programs are for performing transactions indicated by flow charts in FIGS. 5 and 6, and stored in a control program memory 23a.

The RAM 24 is a memory which allows data stored therein to be accessed at random. The RAM 24 includes a temporary memory 24a which temporarily stores variables and parameters when the CPU 22 performs one or ones of the various functions.

The flash memory 25 is a rewritable and nonvolatile memory for storing various settings.

The scanner section 3 reads an image of a document set at a predetermined reading position, and produces image data relating to the read image on the basis of a command from the CPU 22. Where the facsimile function is selected, the image data read by the scanner section 3 is transmitted to an external facsimile device designated by, e.g., a telephone number, via the modem 33, the line control portion 34, and a telephone line network 100.

Where the copying function is selected, the printer section 2 records an image on a recording sheet on the basis of the image data produced by the scanner section 3.

The printer section 2 is provided by an ink-jet printer for recording, on the basis of a command from the CPU 22, images or characters on a recording sheet supplied from the sheet supply tray 14. The printer section 2 includes a motor (not shown) for feeding a recording sheet, a recording head (not shown) for ejecting ink droplets onto a recording sheet, a carriage (not shown) on which the recording head is mounted, and a carriage motor (not shown) for moving the carriage.

Where the facsimile function is selected and where the MFP 1 is set to record images or characters relating to facsimile data received from an external facsimile device via the telephone line network 100, the line control portion 34, and the modem 33, the printer section 2 records, on a recording sheet, an image based on image data produced on the basis of facsimile data received from an external facsimile device.

The modem 33 modulates, on the basis of a command of the CPU 22, image data produced by the scanner section 3 into image signals transmittable to the telephone line network 100 via the line control portion 34. The modem 33 also demodulates, on the basis of a command of the CPU 22, image signals received from the telephone line network 100 via the line control portion 34, into image data.

The line control portion 34 inputs various signals received from the telephone line network 100 and outputs signals to the telephone line network 100. The line control portion 34 also sets, on the basis of a command of the CPU 22, a transmission path through which signals inputted to or outputted from the telephone line network 100 are transmitted. That is, the line control portion 34 sets where the signals are transmitted to and from. For example, the line control portion 34 sets a transmission path toward the modem 33 when a user presses a predetermined one of the operation keys 40 to transmit image data (i.e., facsimile data), or when an image signal (i.e., facsimile data) is received from the telephone line network 100.

The LAN I/F 30 communicates via a LAN 200 with external devices such as a personal computer 60 (hereinafter, referred to as a PC 60) connected to the LAN 200. The LAN I/F 30 can receive, from the PC 60, print data used for printing by the printer section 2, and can transmit, to the PC 60, image data read by the scanner section 3.

There will be next explained the operation panel 4 of the MFP 1 in detail with reference to FIGS. 3A, 3B, 3C, and 3D. FIGS. 3A, 3B, 3C, and 3D show the operation panel 4. Initially, there will be explained the operation keys 40 provided on the operation panel 4 in detail with reference to FIG. 3A. Four function keys (function-select keys) 40a disposed on the right side of the LCD 41 include, in order from an uppermost key, a fax key, a copy key, a scan key, and a photo key. The fax key is used for selecting the facsimile function. When the fax key is pressed, that is, where the facsimile function is selected, respective contents of various items such as a telephone number for designating an external facsimile device are inputted and set. Then, image data read by the scanner section 3 is transmitted to the external facsimile device.

The copy key is used for selecting the copying function. When the copy key is pressed, that is, where the copying function is selected, respective contents of various items such as the number of copies are inputted. Then, the printer section 2 records an image on a recording sheet or the like on the basis of image data read by the scanner section 3.

The scan key is used for selecting the scanner function. When the scan key is pressed, that is, where the scanner function is selected, the scanner section 3 reads an image of a document placed on the document reading table 6. Then, image data produced on the basis of the read image is stored in the RAM 24.

The photo key is used for selecting a photo function. When the photo key is pressed, that is, where the photo function is selected, the printer section 2 records an image on the basis of image data stored in a card memory mounted into the slot portion 72.

A ten-key numeric pad 40b including twelve keys arranged in three columns and four lines is disposed on the left side of the LCD 41. The twelve keys are constituted by ten numeric keys for inputting numeric characters "0"-"9", and two keys for inputting symbols "#" (and "*". A guide key 40c is disposed on the left bottom side of the ten-key numeric pad 40b. When the guide key 40c is pressed, help information for explaining a role of a designated one of the operation keys 40 is displayed on the LCD 41. As described above, the guide key 40c can be considered to serve as a role-information-display start key for starting a display of information with respect to a role of each of the at least one of the operation keys 40.

An OK key 40d and a menu key 40e are disposed on the right bottom side of the function keys 40a. Where respective contents of various setting items are set in a selected one of the functions, the OK key 40d commands a confirmation of each of the contents.

In a state in which any of the functions is not selected when the menu key 40e is pressed, a view for selecting one of functions (hereinafter, referred to as extra functions) other than the functions assigned to the function keys 40a is displayed. Thus, a user can select one of the extra functions. Where one of the functions assigned to the function keys 40a is selected and when the menu key 40e is pressed, setting items in the selected function are displayed on the LCD 41. Thus, a user can set respective contents of the setting items.

Four cursor keys 40f including an up key, a down key, a right key, and a left key respectively for controlling up, down, right, and left are disposed in a cross shape on the right side of the function keys 40a. Where the setting items are displayed, a user can select one of the setting items through the up key and the down key, and can set, through the right key and the left key, a content of the selected setting item. When the guide key 40c is pressed, that is, where a display of the help information is commanded, the help information with respect to one of the operation keys 40 which corresponds to an image thereof selected through the cursor keys 40f can be displayed.

An exit key 40g is disposed on the right side of the cursor keys 40f. The exit key 40g is used for canceling an operation performed through one of the operation keys 40 and for returning to a state immediately before the operation is performed. A color-performance-start-command key 40h (hereinafter, referred to as a color-start key 40h) and a monochrome-performance-start-command key 40i (hereinafter, referred to as a monochrome-start key 40i) are both used for commanding a performance of a selected one of the functions. More specifically, the color-start key 40h is used for commanding the printer section 2 and the scanner section 3 to perform the respective functions in color. On the other hand, the monochrome-start key 40i is used for commanding the printer section 2 and the scanner section 3 to perform the respective functions in monochrome. As described above, the operation keys 40 have respective roles. When a user operates one of the operation keys 40, a processing corresponding to a role of the operated one of the operation keys 40 is executed.

Figure 3A:
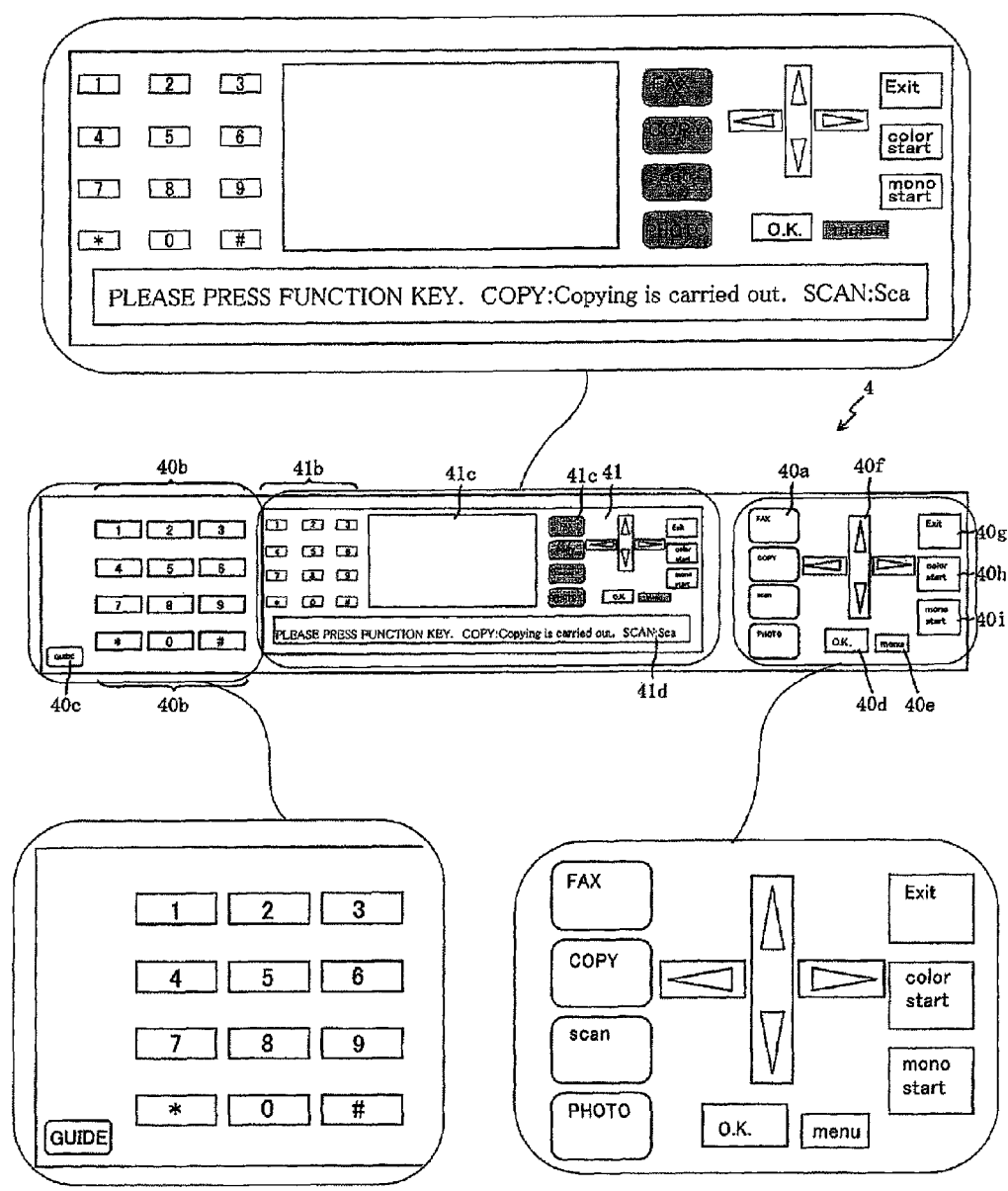
FIG. 3A is a plan view showing an operation panel in a state in which no function is selected.

There will be next explained screens and images displayed on the LCD 41. That is, the LCD 41 can be considered to display operation view for assisting an operation of the user. As shown in FIG. 3A, a sub-screen 41c which is a schematic image of the LCD 41, a help-information-display screen 41d, and images schematically and respectively representing the operation keys 40 are displayed on the LCD 41. In this view, a positional relationship of the LCD 41 and the operation keys 40 on the operation panel 4 is the same as a positional relationship of the sub-screen 41c and the images respectively representing the operation keys 40. Further, the images respectively representing the operation keys 40 are disposed in respective positions that have a relationship the same as a relationship of positions of the respective operation keys 40 on the operation panel 4.

More specifically, the sub-screen 41c corresponding to the LCD 41 is displayed on a middle of the LCD 41. On the right side of the sub-screen 41c, four function key images 41a respectively representing the function keys 40a are displayed on the LCD 41.

On the right side of the function key images 41a, images respectively representing the OK key 40d, the menu key 40e, the cursor keys 40f, the exit key 40g, the color-start key 40h, and the monochrome-start key 40i are displayed on the LCD 41.

On the left side of the sub-screen 41c, a ten-key image 41b representing the ten-key numeric pad 40b is displayed on the LCD 41. The ten-key image 41b includes twelve images arranged in three columns and four lines and respectively representing the twelve keys constituting the ten-key numeric pad 40b.

Under the function key images 41a, the ten-key image 41b, the sub-screen 41c, and the like, the help-information-display screen 41d, as a special area of the operation view, for explaining a role of at least one of the operation keys 40 is displayed on the LCD 41. In help-information-display screen 41d, usually, there are successively displayed help information for explaining respective roles of active operation keys which will be explained below. When the guide key 40c is pressed, that is, displaying of help information is commanded, there is displayed help information for explaining a role of each of at least one of the operation keys 40 which corresponds to one of the images of the operation keys 40 that is designated by a user through the cursor keys 40f.

There will be next explained, with reference to FIGS. 3A, 3B, 3C, 3D, 4A, and 4B, the images and the screens displayed on the LCD 41 which are changed according to operations of a user. That is, a plurality of operation views each as the operation view are displayed on the LCD 41. One of the operation views which is displayed on the LCD 41 shows a current state of the MFP 1. On the other hand, when a user operates at least one of the operation keys 40, at least one processing each corresponding to one of the at least one of the operation keys 40 is executed. The operation keys 40 are divided into the active (effective) operation keys and inactive (ineffective) operation keys according to the current state of the MFP 1, which may confuse a user about which key to press. To solve this problem, in this MFP 1, active-key-images as images respectively representing the active operation keys and inactive-key-images as images respectively representing the inactive operation keys are displayed on the LCD 41 in different manners. When a user presses one of the active operation keys, a processing assigned to the pressed active operation key is executed. On the other hand, when a user presses one of the inactive operation keys, a processing assigned to the pressed inactive operation key is not executed.

In this MFP 1, as the different manners, the active-key-images are highlighted, while the inactive-key-images are not highlighted. For example, the active-key-images are displayed in bright color or in noticeable color (e.g., red), while the inactive-key-images are displayed in dark color (e.g., grey).

As described above, the active-key-images are highlighted on the LCD 41, while the inactive-key-images are not highlighted on the LCD 41. Thus, a user has only to press one of the active operation keys to execute a desired processing. Consequently, the user is not confused about which key to press, whereby operability of the MFP 1 is improved.

FIG. 3A is a plan view, as one of the operation view, showing the operation panel 4 in a state in which any of the functions such as the facsimile function and the copying function is not selected. In this state, an operation view for selecting one of the functions is displayed on the LCD 41. Hereinafter, this view is referred to as a function-select view.

In the function-select view, the function key images 41a and the image representing the menu key 40e are highlighted. The images respectively representing the other of the operation keys 40 are not highlighted. It is noted that, in the drawings, active or highlighted images and areas are shaded. Where any of the functions is not selected, the function keys 40a and the menu key 40e are active or effective, while the other of the operation keys 40 are inactive or ineffective. Thus, a user can understand, by visually identifying the function-select view, that any of the functions is not selected and can further understand that one of the function keys 40a should be pressed by identifying the highlighted function key images 41a, thereby improving operability of the MFP 1.

Where one of the functions is selected, another operation view is displayed on the LCD 41 according to the selected function. In this view, images respectively representing keys for various settings in the selected function and for performing the selected function are highlighted. Hereinafter, this view is referred to as a function-perform view.

In the function-perform view, images respectively representing ones of the operation keys 40 which are for setting respective contents of setting items in a selected one of the functions and for commanding a performance of the selected function are highlighted. The images respectively representing the other of the operation keys 40 are not highlighted. Thus, a user can understand, by visually identifying the function-perform view, that one of the functions is being selected and can further understand that any of the ones of the operation keys 40 which are for setting the respective contents and for commanding the performance of the selected function should be pressed by identifying the highlighted images, thereby improving operability of the MFP 1.

Figure 3B:
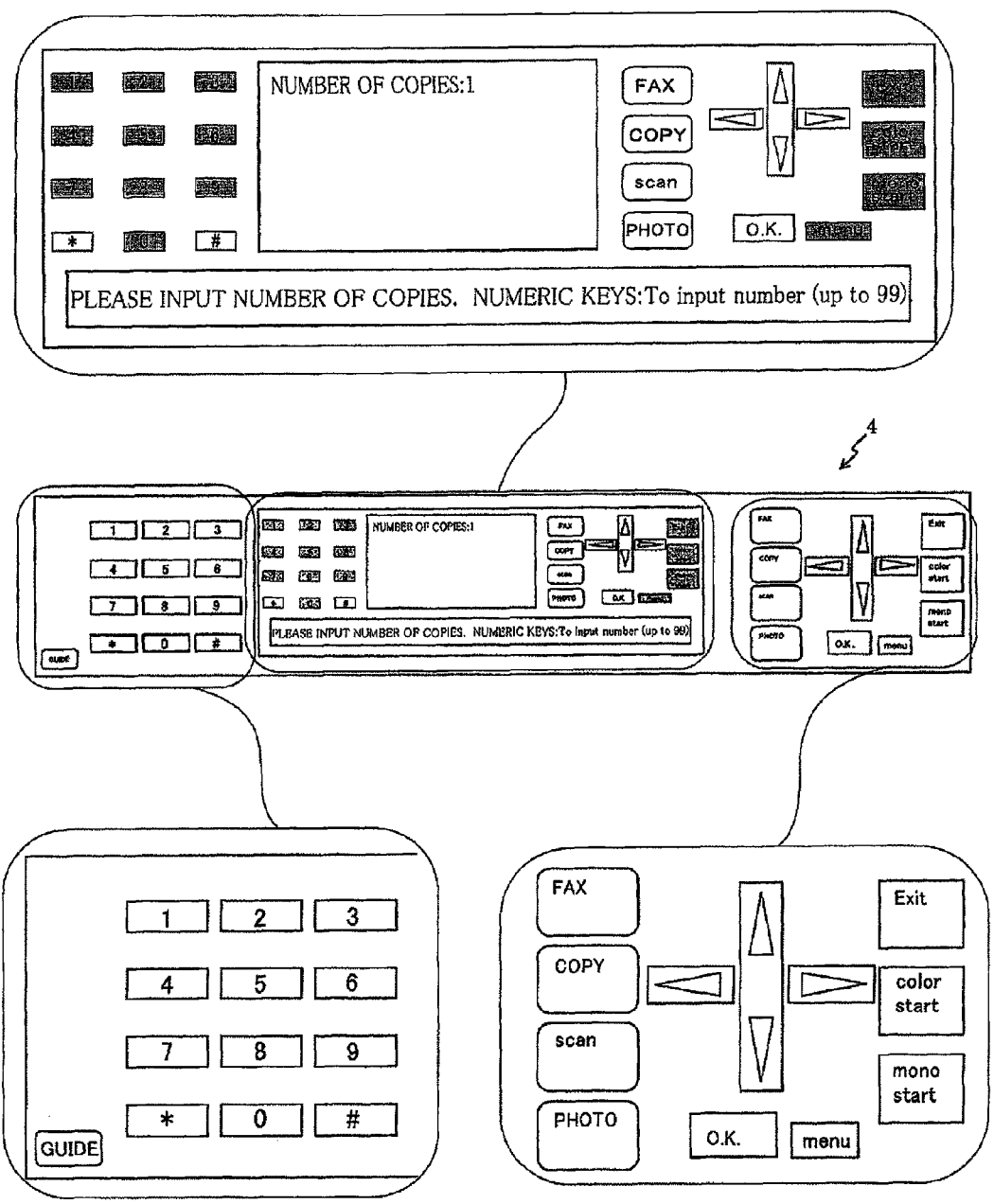
FIG. 3B is a plan view showing the operation panel in a state in which a copying function is selected.

FIG. 3B is a plan view, as the function-perform view, showing the operation panel 4 in a state in which the copying function is selected. In this state, the images respectively representing the ten numeric keys of the ten-key numeric pad 40b, the menu key 40e, the exit key 40g, the color-start key 40h, and the monochrome-start key 40i are highlighted.

Accordingly, ones of the operation keys 40 which correspond to images that are not highlighted, such as the function keys 40a and the two keys of the ten-key numeric pad 40b for inputting symbols "#" and "*", are inactive.

It is displayed, in the sub-screen 41c, that the number of copies is "1" by default. When a user presses one or ones of the numeric keys, a number inputted through, the numeric keys is set as the number of copies, and the number is displayed in the sub-screen 41c.

In the function-perform view, when the menu key 40e is pressed, setting items are displayed. The setting items will be explained below with reference to FIGS. 4A and 4B. In the function-perform view, when the exit key 40g is pressed, the function-select view is displayed. When the color-start key 40h or the monochrome-start key 40i is pressed, one of the functions is performed in a manner corresponding to the pressed key. That is, when the color-start key 40h is pressed, the printing function is performed in color, while when the monochrome-start key 40i is pressed, the printing function is performed in monochrome. When the performance in the manner corresponding to the pressed one of the keys 40h and 40i is completed, the function-select view is displayed on the LCD 41.

FIG. 3C is a plan view, as the function-perform view, showing the operation panel 4 in a state in which the guide key 40c has been pressed. When the guide key 40c is pressed, the images respectively representing the cursor keys 40f are highlighted on the LCD 41, and a cursor for designating at least one of the images respectively representing the operation keys 40 is displayed. The cursor is moved by a user through the cursor keys 40f. When the user moves the cursor and designates at least one of images respectively representing the keys, help information for explaining a role of at least one of the operation keys 40 which corresponds to the designated image is displayed at a time in the help-information-display screen 41d. In FIG. 3C, an image in shade represents the cursor, and the image representing the ten-key numeric pad 40b is designated by the cursor. The guide key 40c is active in the function-select view and the function-perform view. When the guide key is pressed in a state in which help information is displayed, the help information disappears. It is noted that the help information is successively displayed (e.g., scrolled) where the help information cannot be entirely displayed at a time in the help-information-display screen 41d owing to a large amount of information to be displayed. Thus, the MFP 1 can be configured to have a smaller LCD, leading to lower cost.

Figure 3D:
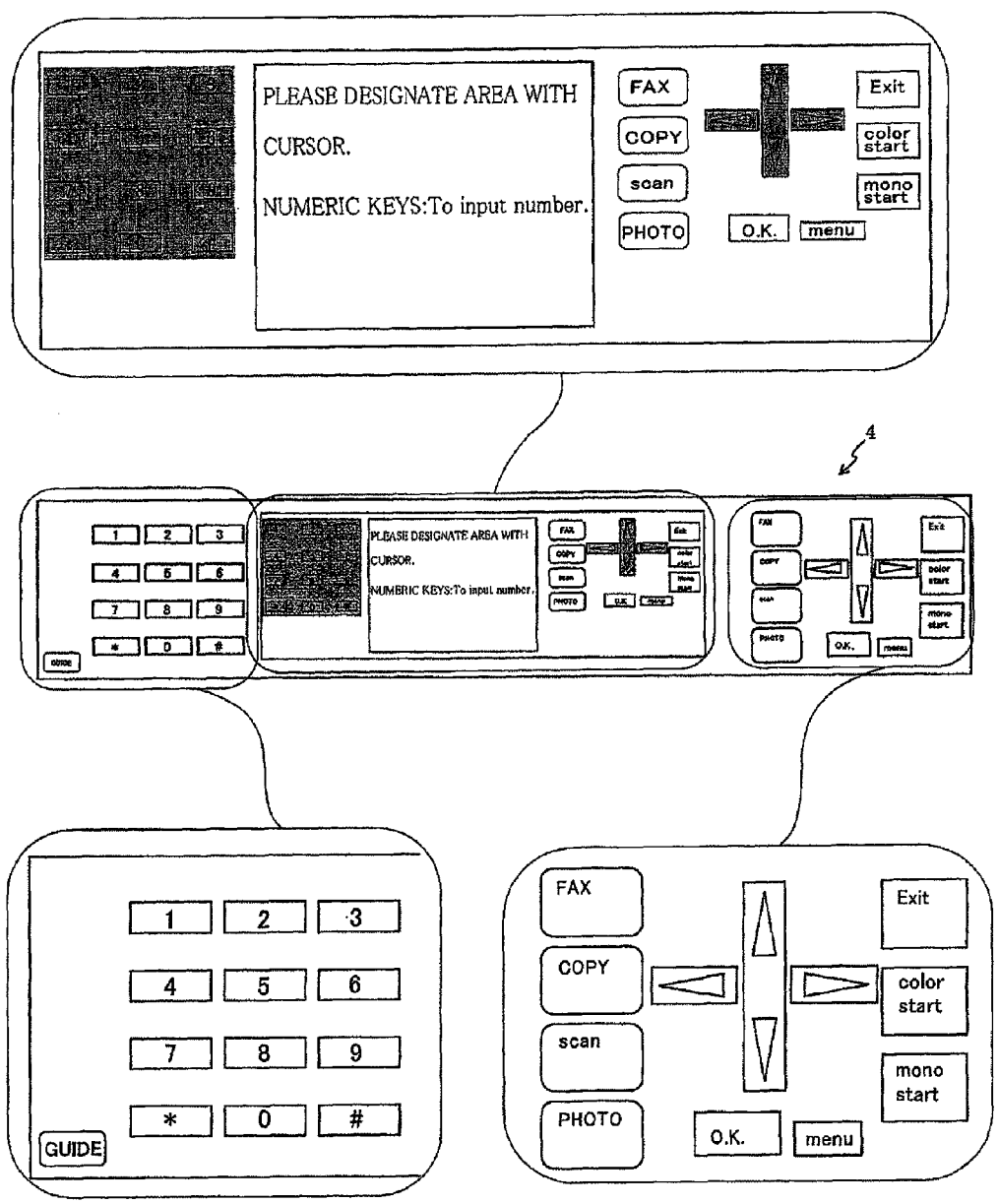
FIG. 3D is a plan view showing the operation panel in a state in which help information is displayed in a sub-screen.

FIG. 3D is a plan view, as one of the operation views, showing the operation panel 4 in which the help-information-display screen 41d is not provided, and help information is displayed in the sub-screen 41c as a special area. As in the case of FIG. 3C, when the guide key 40c is pressed, help information for explaining a role of at least one of the operation keys 40 which corresponds to at least one of images that is designated through the cursor keys 40f is displayed at a time on the LCD 41. Where one of the functions is selected, information for explaining respective roles of active operation keys is displayed on the LCD 41. In FIG. 3D, since the help-information-display screen 41d is not provided, the sub-screen 41c can be provided in a larger area, so that a large amount of information can be displayed at a time in the sub-screen 41c. Further, since the help-information-display screen 41d is not provided, more images such as images respectively representing keys can be displayed.

Further, as not shown in any drawings, the MFP 1 may be configured such that an image representing an operated one of the operation keys 40 is displayed such that an operation of the operated one of the operation keys 40 is recognizable. More specifically, the MFP 1 may be configured such that when one of the keys is pressed by a user, a color of image representing the pressed key is changed. Thus, the user can verify whether a processing corresponding to the operation of the user is actually executed or not.

Figure 4A:
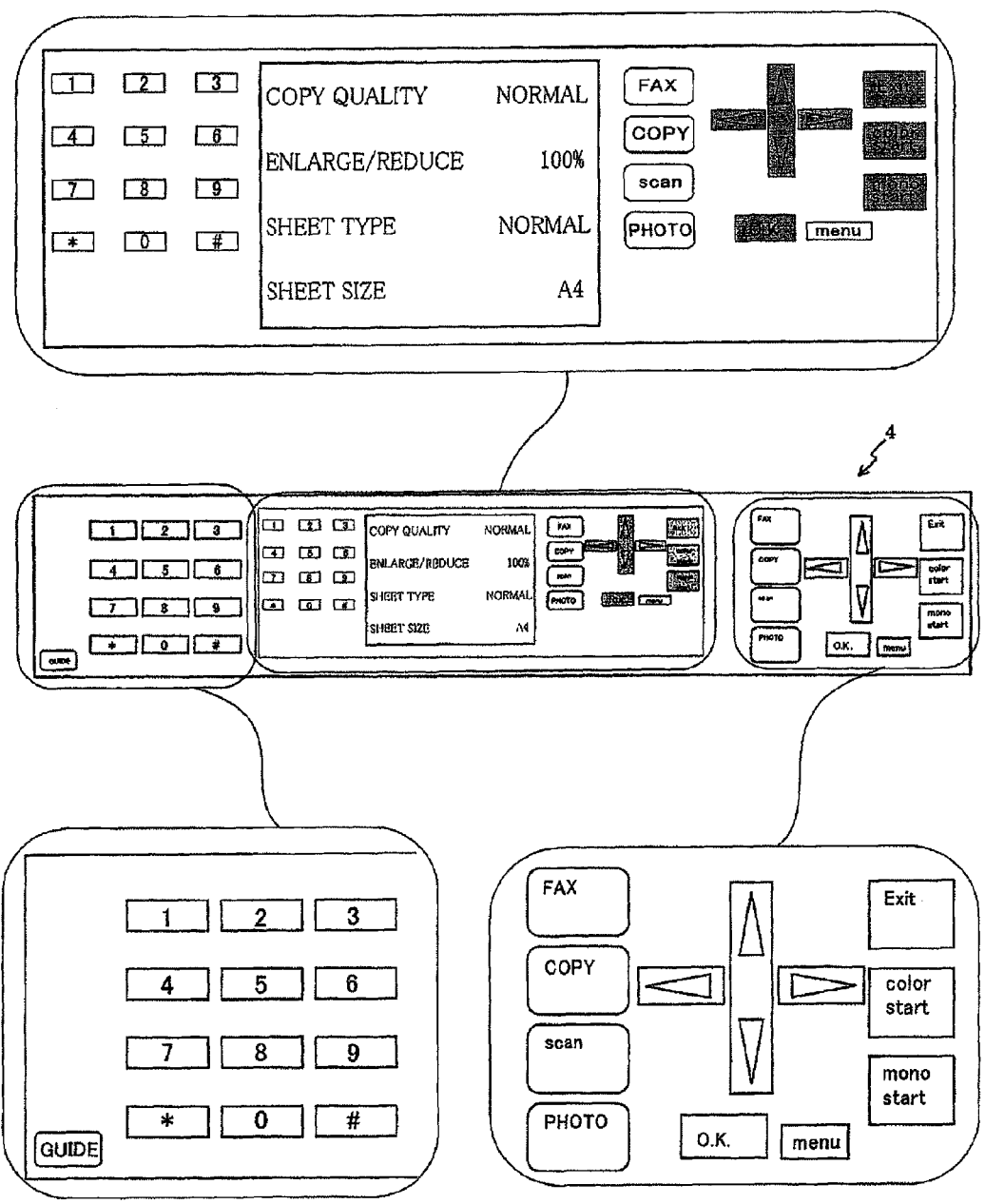
FIG. 4A is a plan view showing the operation panel in a state in which a user has selected the copying function and pressed the menu key.
Figure 4B:
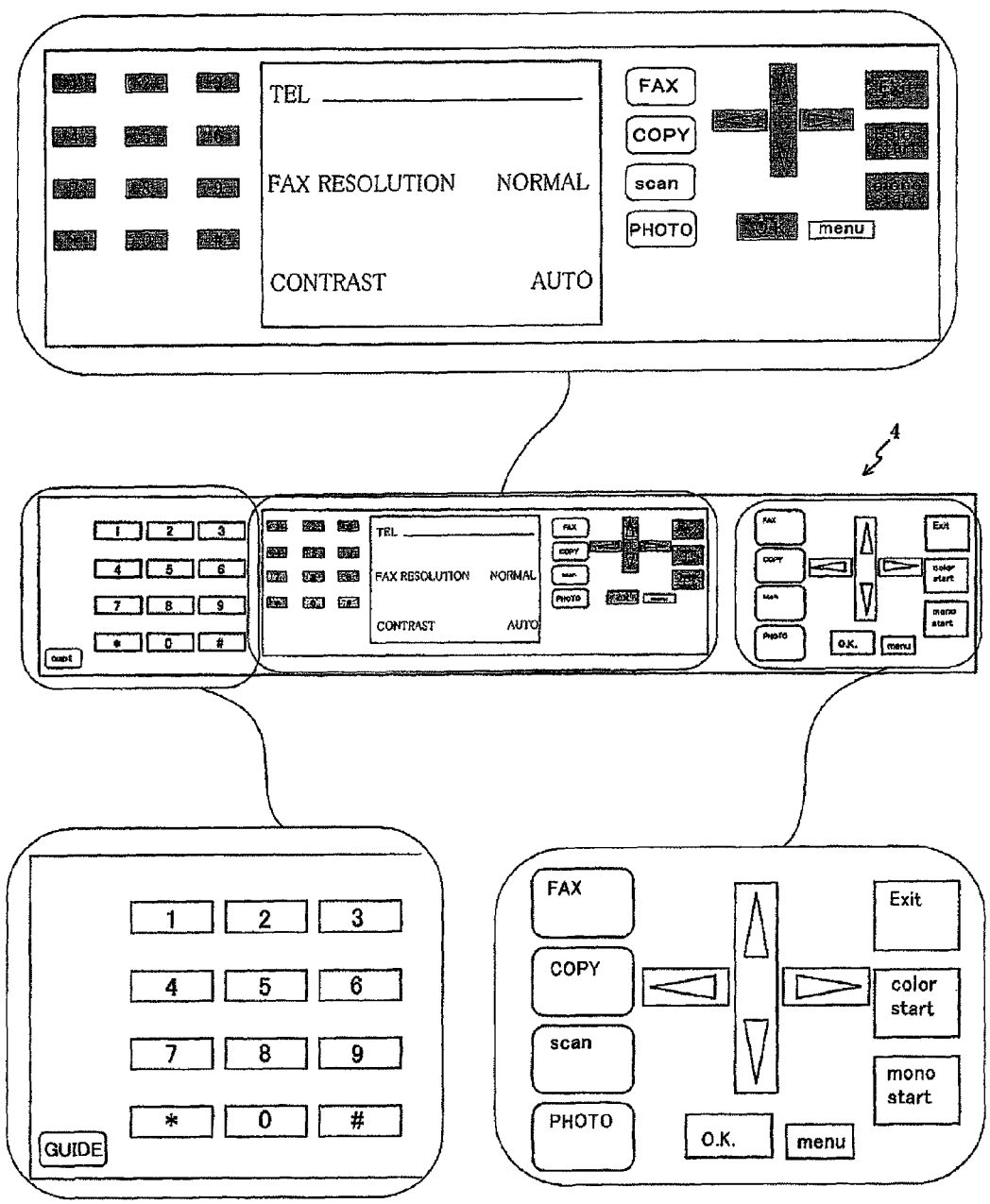
FIG. 4B is a plan view showing the operation panel in a state in which a user has selected the facsimile function and pressed the menu key.

There will be next explained the setting items with reference to FIGS. 4A and 4B. FIG. 4A is a plan view, as one of the operation views, showing the operation panel 4 in a state in which a user has selected the copying function and pressed the menu key 40e. FIG. 4B is a plan view, as one of the operation views, showing the operation panel 4 in a state in which a user has selected the facsimile function and pressed the menu key 40e. As shown in FIG. 4A, the setting items including, in order from the top, a copy quality in a first line, an enlarge and reduce ratio in a second line, a sheet type in a third line, and a sheet size in a fourth line are displayed in the sub-screen 41c. When a user sets respective contents of the setting items, the user selects one of the lines through the up key or the down key of the cursor keys 40f. The selected line is displayed, for example, in shade. Subsequently, the user sets the respective contents of the setting items through the left key or the right key of the cursor keys 40f. For example, when setting a content of the copy quality, a user selects the first line through the up key or the down key of the cursor keys 40f, so that the first line is displayed in shade. Subsequently, the user sets to one of a normal quality and a high quality which are alternately displayed when the right key or the left key of the cursor keys 40f is pressed.

When setting a content of the enlarge and reduce ratio, a user selects the second line. Subsequently, the user sets to one of ratios of 50%, 75%, 100%, 125%, 150%, and 200% through the right key or the left key. Each time when the user presses the right key, the ratio increases. Each time when the user presses the left key, the ratio decreases. Likewise, when setting a content of the sheet type, a user sets to one of a normal sheet and a glossy sheet. When setting a content of the sheet size, a user sets to one of various sizes such as B5, A4, B4, and A3.

As shown in FIG. 4B, where the facsimile function is selected, setting items including, in order from the top, a telephone number for designating an external facsimile device in a first line, a resolution in a second line, and a setting of a contrast in a third line are displayed in the sub-screen 41c. Like the setting in the copying function, when setting respective contents of the setting items, the user selects one of the lines through the up key or the down key of the cursor keys 40f. The content of the telephone number is set through the ten-key numeric pad 40b. When setting the content of the resolution, the user sets to one of a normal resolution and a high resolution which are alternately displayed by the user pressing the right key or the left key of the cursor keys 40f. Likewise, when setting the setting of the contrast, the user sets to one of "auto", "high", and "low" which are displayed in rotation by the user pressing the right key or the left key of the cursor keys 40f. It is noted that, in view of the above, each of the ten-key numeric pad 40b and the cursor keys 40f can be considered to be a set key for setting the respective contents of the setting items relating to a selected one of the functions.

Figure 5:
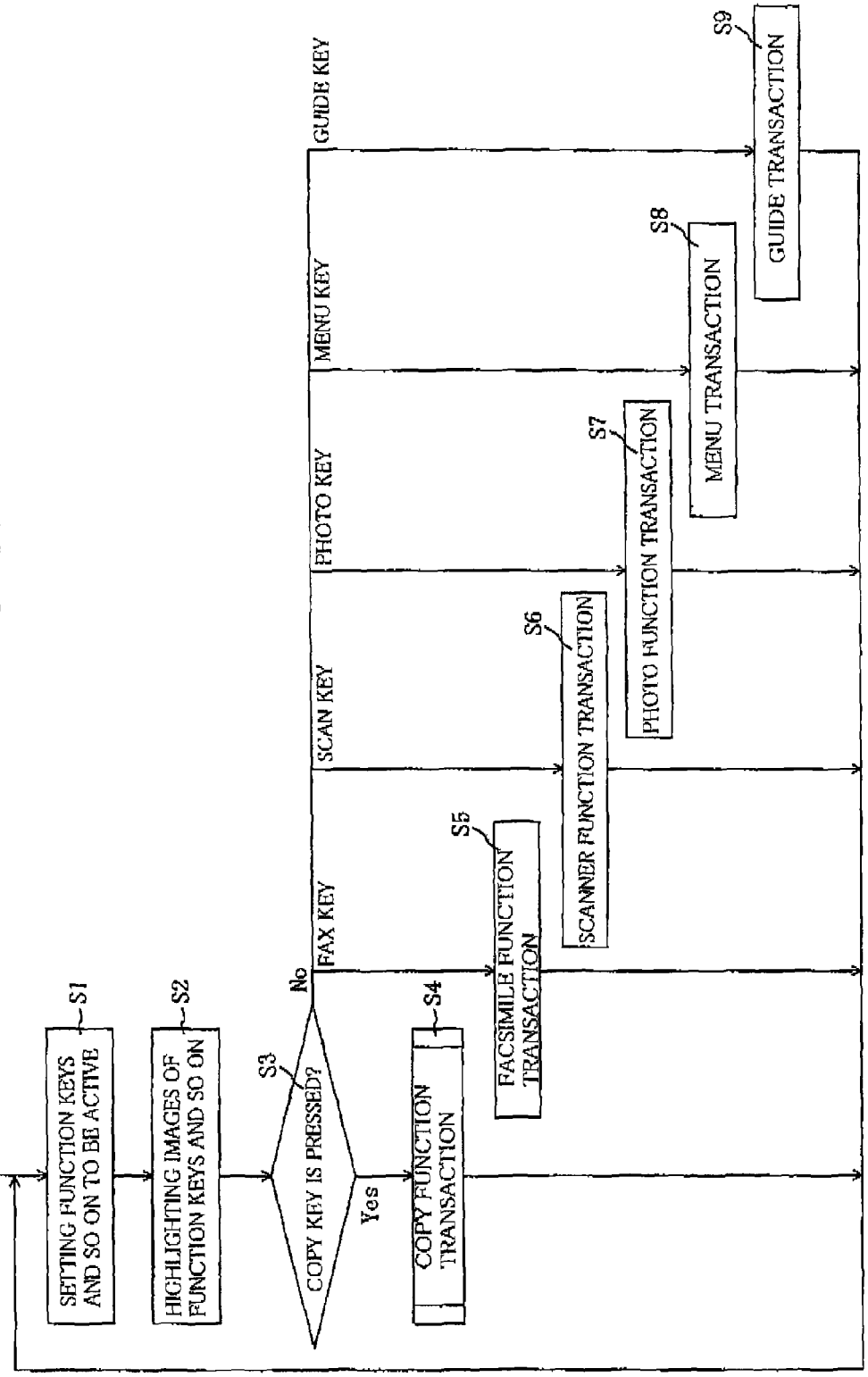
FIG. 5 is a flow chart indicating a flow of a main transaction.
Figure 6:
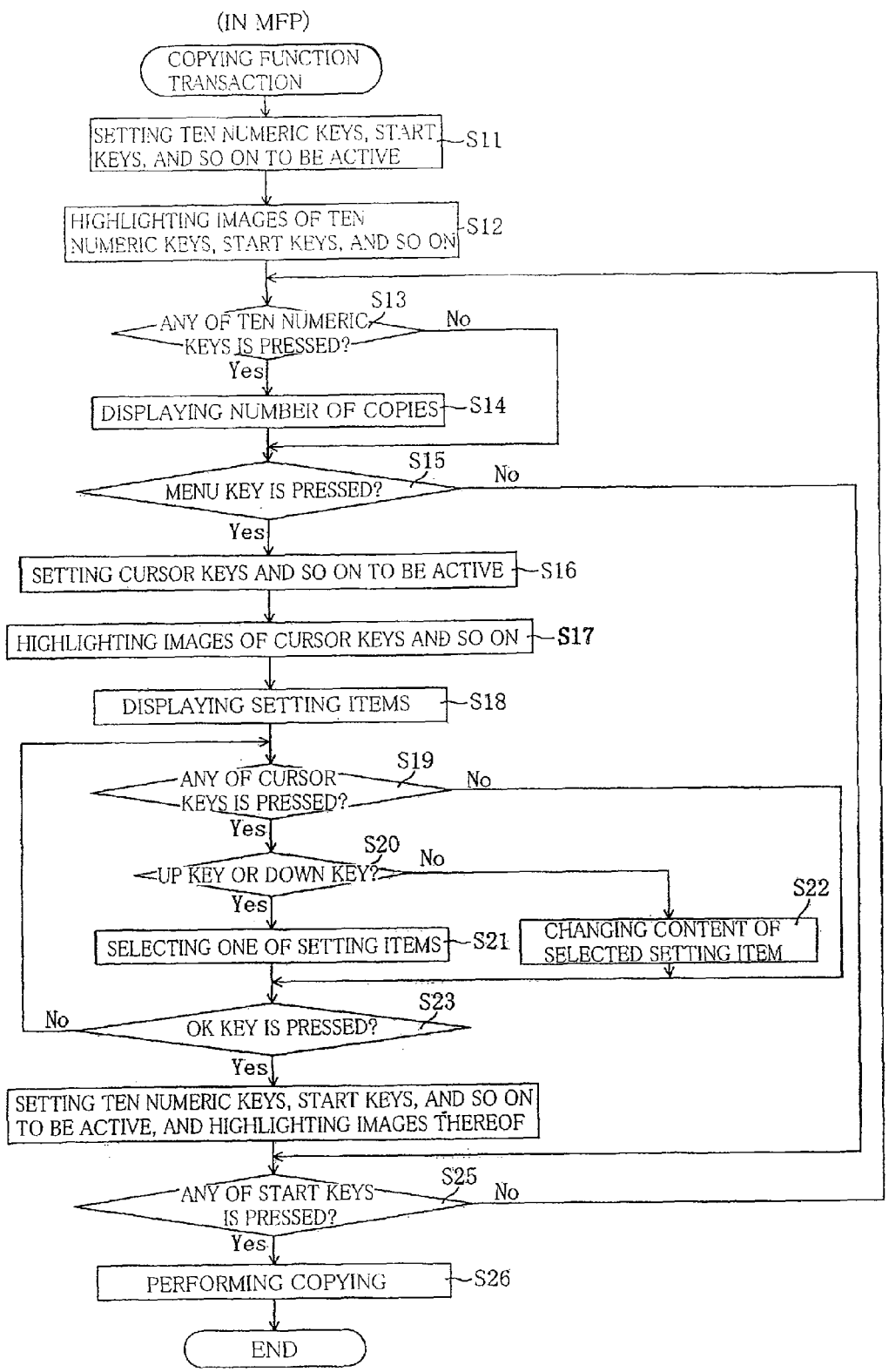
FIG. 6 is a flow chart indicating a flow of a transaction in the copying function.

There will be next explained, with reference to FIGS. 5 and 6, the transactions which are performed by the CPU 22. FIG. 5 is a flow chart indicating a flow of a main transaction which is performed by the CPU 22. FIG. 6 is a flow chart indicating a flow of a transaction which is performed where the copying function is selected.

Initially, the flow chart of the main transaction shown in FIG. 5 will be explained. The main transaction is repeatedly performed from the time when the MFP 1 is turned on, until the time when the MFP 1 is turned off.

Since any of the functions is not selected immediately after the MFP 1 is turned on, the function-select view shown in FIG. 3A is displayed on the LCD 41. That is, the function keys 40a, the guide key 40c, and the menu key 40e are set to be active, while the other keys are set to be inactive (S1). Then, the function key images 41a and the image representing the menu key 40e are highlighted, while images respectively representing the other keys are not highlighted (S2).

Subsequently, whether the copy key is pressed or not is judged by checking an operation to the operation keys 40 on the operation panel 4 (S3). When the copy key is pressed (S3: Yes), the transaction in the copying function is performed (S4). This transaction will be explained with reference to the flow chart shown in FIG. 6.

When the copy key is not pressed (S3: No), whether one of the other keys is pressed or not is judged. When the fax key is pressed, a transaction in the facsimile function is performed (S5). When the scan key is pressed, a transaction in the scanner function is performed (S6). When the photo key is pressed, a transaction in the photo function is performed (S7). When the menu key 40e is pressed, the view for selecting the extra functions other than the facsimile function, the copying function, the scanner function, and the photo function are displayed on the LCD 41, and setting respective contents of setting items in a selected one of the extra functions is permitted (S8). When the guide key 40c is pressed, help information for explaining a role of at least one of the operation keys 40 which is designated through the cursor keys 40f is displayed (S9). The flow returns to S1 after execution of one of S4, S5, S6, S7, S8, and S9. It is noted that the transactions in the facsimile, the scanner, and the photo functions are similar to the transaction in the copying function, and an explanation of the transactions is dispensed with.

It is further noted that, in view of the above, the microcomputer 20 can be considered to include a role-information-display control section which is configured to control the LCD 41 to display the help information in the help-information-display screen 41d on the basis of an operation of a user to the guide key 40c, and which is partly constituted by a portion for executing S9.

There will be next explained, with reference to FIG. 6, the transaction in the copying function. In this transaction, the function-perform view shown in FIG. 3B is initially displayed on the LCD 41. That is, the ten numeric keys of the ten-key numeric pad 40b, the menu key 40e, the exit key 40g, the color-start key 40h, and the monochrome-start key 40i are set to be active, while the other keys are set to be inactive (S11). Subsequently, the images respectively representing the ten numeric keys of the ten-key numeric pad 40b, the menu key 40e, the exit key 40g, the color-start key 40h, and the monochrome-start key 40i are highlighted, while images respectively representing the other keys are not highlighted (S12).

It is noted that when the exit key 40g is pressed, the latest processing is canceled, and the MFP 1 establishes a state immediately before the latest operation is performed. This procedure is omitted in this flow chart to avoid a complicated explanation.

Subsequently, whether any of the ten numeric keys is pressed or not is judged (S13). When any of the ten numeric keys is pressed (S13: Yes), the number of copies which is displayed in the sub-screen 41c is changed to a number inputted through the numeric keys, and the changed number of copies is stored in the temporary memory 24a (S14).

Where S14 has been executed, or where any of the numeric keys is not pressed (S13: No), whether the menu key 40e is pressed or not is judged (S15). When the menu key 40e is pressed (S15: Yes), the view, shown in FIG. 4A, for setting the respective contents of the setting items is displayed. That is, the OK key 40d, the cursor keys 40f, the exit key 40g, the color-start key 40h, and the monochrome-start key 40i are set to be active, while the other keys are set to be inactive (S16). Then, images respectively representing these active operation keys are highlighted, while images respectively representing these inactive operation keys are not highlighted (S17). Subsequently, the setting items in the copying function are displayed in the sub-screen 41c (S18).

Next, whether any of the cursor keys 40f is pressed or not is judged (S19). When any of the cursor keys 40f is pressed (S19: Yes), the up key or the down key of the cursor keys 40f is pressed or not is judged (S20). When the up key or the down key is pressed (S20: Yes), one of the setting items is selected according to an operation of a user (S21). When the right key or the left key is pressed (S20: No), a content of the selected setting item is changed (S22).

Where S21 or S22 has been executed, or where any of the cursor keys 40f is not pressed (S19: No), whether the OK key 40d is pressed or not is judged (S23). When the OK key 40d is pressed (S23: Yes), the respective contents of the setting items are confirmed. Then, the function-perform view is displayed on the LCD 41. That is, the ten numeric keys of the ten-key numeric pad 40b, the menu key 40e and so on are set to be active, and the images respectively representing the ten numeric keys of the ten-key numeric pad 40b, the menu key 40e and so on are highlighted (S24). Where the OK key 40d is not pressed (S23: No), the flow returns to S19.

Where S24 has been executed, or where the menu key 40e is not pressed in S14 (S15: No), whether the color-start key 40h or the monochrome-start key 40i is pressed or not is judged (S25). When the color-start key 40h is pressed (S25: Yes), the printing is performed in color (S26). When the monochrome-start key 40i is pressed (S25: Yes), the printing is performed in monochrome (S26). Then, the transaction in the copying function is completed. When any of the color-start key 40h and the monochrome-start key 40i is not pressed (S25: No), the flow returns to S13.

It is noted that, in view of the above, the microcomputer 20 can be considered to include an active-and-inactive-key determining section configured to determine the at least one active operation key and the at least one inactive operation key on the basis of an operation of an user, and which is partly constituted by a portion for executing S1, S11, and S16.

As explained above, in this MFP 1, the image representing the operation panel 4 is displayed on the LCD 41 on the basis of an operation of the user, such that the active operation keys and the inactive operation keys are recognizable by a user. Consequently, the user can easily understand which key to operate by visually identifying the LCD 41, thereby improving operability of the MFP 1.

Further, the help information for explaining a role each of at least one of the active operation keys is displayed, whereby a user can perform an appropriate operation by referring to the help information. Furthermore, the help information of at least one of the keys which is designated through the cursor keys 40f is displayed on the basis of an operation to the guide key 40c by a user. Consequently, the user can understand the role of the designated key, thereby improving operability of the MFP 1.

It is noted that the microcomputer 20 can be considered to include a display control section which mainly controls the LCD 41 to selectively display one of the above-described operation views. For example, the display control section includes a portion for executing S2, S12, and S17.

It is to be understood that the present invention is not limited to the details of the illustrated embodiment, but may be embodied with various changes and modifications, which may occur to those skilled in the art, without departing from the spirit and scope of the invention.

For example, the operation panel 4 is displayed in its entirety on the LCD 41, but the MFP 1 may be configured such that a part of the operation panel 4 which includes active operation keys is displayed

What is claimed is:

1. A multi-function apparatus having a plurality of functions relating to an image processing and configured to selectively realize one of the plurality of functions, comprising:
    a plurality of operation keys which are operated so as to control the multi-function apparatus;
    a display device configured to display an operation view for assisting in operating the plurality of operation keys;
    a display control section configured to control the display device to display the operation view in which a plurality of images respectively representing the plurality of operation keys are displayed, such that an image of each of at least one active key each as an active one of the plurality of operation keys is displayed in the operation view in a first manner, while an image of each of at least one inactive key each as an inactive one of the plurality of operation keys is displayed in the operation view in a second manner which is different from the first manner; and
    an operation panel on which the plurality of operation keys are disposed,
    wherein the display control section is configured to control the display device to display the operation view in which the plurality of images respectively representing the plurality of operation keys are disposed in respective positions that have a relationship the same as a relationship of positions of the respective operation keys on the operation panel.

2. The multi-function apparatus according to claim 1, wherein the display control section is configured to control the display device to selectively display one of a plurality of operation views each as the operation view and each corresponding to one of the plurality of functions, and is configured to control the display device to display, according to a displayed one of the plurality of operation views, the image of each of at least one active key and the image of each of at least one inactive key in the respective first and second manners.

3. The multi-function apparatus according to claim 2, wherein the display control section is configured to control the display device to change, by an operation, one of the plurality of operation views to another one.

4. The multi-function apparatus according to claim 1, wherein the display control section is configured to control the display device to display an image of an operated one of the plurality of operation keys, such that an operation of the operated one of the plurality of operation keys is recognizable.

5. The multi-function apparatus according to claim 1, further comprising an active-and-inactive-key determining section configured to determine the at least one active key and the at least one inactive key, wherein the display control section is configured to control the display device to display the image of each of at least one active key and the image of each of at least one inactive key on the basis of a determination of the active-and-inactive-key determining section.

6. The multi-function apparatus according to claim 5, wherein the active-and-inactive-key determining section is configured to determine the at least one active key and the at least one inactive key on the basis of an operation.

7. The multi-function apparatus according to claim 5, wherein the plurality of operation keys include at least one function-select key for selecting one of the plurality of functions, and wherein the active-and-inactive-key determining section is configured to determine the at least one function-select key each as one of the at least one active key when any of the plurality of functions is not selected.

8. The multi-function apparatus according to claim 5, wherein the plurality of operation keys includes (a) a command key for commanding a performance of a selected one of the plurality of functions, and (b) at least one set key for setting a content of a setting item relating to the selected one of the plurality of functions, and wherein the active-and-inactive-key determining section is configured to determine the command key and the at least one set key each as one of the at least one active key according to the selected one of the plurality of functions.

9. The multi-function apparatus according to claim 1, wherein the display control section includes a role-information-display control section configured to control the display device to display, in a special area provided in the operation view, information with respect to a role of each of the at least one of the plurality of operation keys.

10. The multi-function apparatus according to claim 9, wherein the role-information-display control section is configured to control the display device to display information with respect to a role of each of at least one of the at least one active key, as the information with respect to the role of each of the at least one of the plurality of operation keys.

11. The multi-function apparatus according to claim 9, wherein the role-information-display control section is configured to control the display device to display, at a time, information with respect to a role of only a designated one of the at least one of the plurality of operation keys, as the information with respect to the role of each of the at least one of the plurality of operation keys.

12. The multi-function apparatus according to claim 11, wherein the display control section is configured to control the display device to display a cursor for designating one of the at least one of the plurality of operation keys, and wherein the plurality of operation keys include at least one cursor key for moving the cursor.

13. The multi-function apparatus according to claim 9, wherein the role-information-display control section is configured to control the display device to successively display, in the special area, the information with respect to the role of each of the at least one of the plurality of operation keys.

14. The multi-function apparatus according to claim 9, wherein the plurality of operation keys include a role-information-display start key for starting displaying of the information with respect to the role of each of the at least one of the plurality of operation keys, and wherein the role-information-display control section is configured to control the display device to display, on the basis of an operation to the role-information-display start key by the user, the information with respect to the role of each of the at least one of the plurality of operation keys.

15. The multi-function apparatus according to claim 1, wherein each of the at least one active key and the at least one inactive key has the same outer appearance as that of a corresponding one of the plurality of images.

16. A multi-function apparatus having a plurality of functions relating to an image processing and configured to selectively realize one of the plurality of functions, comprising:
  a plurality of operation keys which are operated so as to control the multi-function apparatus;
  a display device configured to display an operation view for assisting in operating the plurality of operation keys;
  a display control section configured to control the display device to display the operation view in which a plurality of images respectively representing the plurality of operation keys are displayed, such that an image of each of at least one active key each as an active one of the plurality of operation keys is displayed in the operation view in a first manner, while an image of each of at least one inactive key each as an inactive one of the plurality of operation keys is displayed in the operation view in a second manner which is different from the first manner; and
  an operation panel on which the plurality of operation keys and the display device are disposed,
  wherein the display control section is configured to control the display device to display the operation view in which an image representing the display device is disposed such that a positional relationship of the display device and the plurality of operation keys on the operation panel is the same as a positional relationship of the image representing the display device and the plurality of images respectively representing the plurality of operation keys.

17. The multi-function apparatus according to claim 16, wherein the display control section is configured to control the display device to display, in the image representing the display device, information with respect to the multi-function apparatus.

18. A multi-function apparatus having a plurality of functions relating to an image processing and configured to selectively realize one of the plurality of functions, comprising:
  a plurality of operation keys which are operated so as to control the multi-function apparatus;
  a display device configured to display an operation view for assisting in operating the plurality of operation keys;
  a display control section configured to control the display device to display the operation view in which a plurality of images respectively representing the plurality of operation keys are displayed, such that an image of each of at least one active key each as an active one of the plurality of operation keys is displayed in the operation view in a first manner, while an image of each of at least one inactive key each as an inactive one of the plurality of operation keys is displayed in the operation view in a second manner which is different from the first manner; and an operation panel on which the plurality of operation keys and the display device are disposed, wherein the display control section includes a role-information-display control section configured to control the display device to display, in a special area provided in the operation view, information with respect to a role of each of the at least one of the plurality of operation keys, wherein the display control section is configured to control the display device to display, as the operation view, a view in which an image representing the display device is displayed such that a positional relationship of the display device and the plurality of operation keys on the operation panel is the same as a positional relationship of the image representing the display device and the plurality of images respectively representing the plurality of operation keys, and wherein the role-information-display control section is configured to control the display device to display, in the image representing the display device as in the special area, the information with respect to the role of each of the at least one of the plurality of operation keys.

19. A multi-function apparatus having a plurality of functions relating to an image processing and configured to selectively realize one of the plurality of functions, comprising:

a plurality of operation keys which are operated so as to control the multi-function apparatus;

a display device disposed at a position different from positions of the plurality of operation keys and configured to display an operation view for assisting the user in operating the plurality of operation keys; and a display control section configured to control the display device to display the operation view in which a plurality of images respectively representing at least two of the plurality of operation keys are displayed, such that an image of each of at least one active key each as an active one of the at least two of the plurality of operation keys is displayed in the operation view in a first manner, while an image of each of at least one inactive key each as an inactive one of the at least two of the plurality of operation keys is displayed in the operation view in a second manner which is different from the first manner, wherein each of the at least one active key is configured to perform its function when the key is pressed, wherein each of the at least one inactive key is configured not to perform its function when the key is pressed, wherein the multi-function apparatus further comprises an operation panel on which the plurality of operation keys are disposed, and wherein the display control section is configured to control the display device to display the operation view in which the plurality of images respectively representing the at least two of the plurality of operation keys are disposed in respective positions that have a relationship the same as a relationship of positions of the respective at least two of the plurality of operation keys on the operation panel.

* * * * *